(12) United States Patent
Matsumoto et al.

(10) Patent No.: US 8,332,879 B2
(45) Date of Patent: Dec. 11, 2012

(54) OPTICAL DISK DRIVE

(75) Inventors: Koji Matsumoto, Tokyo (JP); Seiji Hamaie, Kawasaki (JP); Yosuke Ishizuka, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 345 days.

(21) Appl. No.: 12/748,595

(22) Filed: Mar. 29, 2010

(65) Prior Publication Data

US 2010/0262980 A1   Oct. 14, 2010

(30) Foreign Application Priority Data

Apr. 9, 2009   (JP) ................................ 2009-094941

(51) Int. Cl.
*G11B 17/03*   (2006.01)
(52) U.S. Cl. ...................................................... 720/610
(58) Field of Classification Search ................... 720/610
See application file for complete search history.

(56) References Cited

U.S. PATENT DOCUMENTS

| 7,073,183 | B2 * | 7/2006 | Hekizono ..................... 720/610 |
| 7,725,908 | B2 * | 5/2010 | Harada et al. ................. 720/610 |
| 2008/0082993 | A1 * | 4/2008 | Harada et al. ................. 720/610 |

FOREIGN PATENT DOCUMENTS

| JP | 2001344863 A | * | 12/2001 |
| JP | 2003331499 A | * | 11/2003 |
| JP | 2006120190 A | * | 5/2006 |
| JP | 2007-066485 | | 3/2007 |
| JP | 2008165839 A | * | 7/2008 |
| JP | 2009193617 A | * | 8/2009 |

* cited by examiner

*Primary Examiner* — Will J Klimowicz
(74) *Attorney, Agent, or Firm* — Antonelli, Terry, Stout & Kraus, LLP.

(57) ABSTRACT

The present invention provides an optical disk drive that performs a stable lock operation with a small number of components at the time of the insertion of a tray. The optical disk drive has a locking mechanism which engages the inserted tray with the chassis, a reset arm provided in the tray to return the locking mechanism to the initial state, and an engaging boss that is provided in the chassis and is engaged with the reset arm. The tray has a projecting portion for controlling the engagement position between the reset arm and the engaging boss. The projecting portion comes into contact with a back surface of the engaging boss, to control the engaging amount between the reset arm and the engaging boss to be constant.

4 Claims, 5 Drawing Sheets

Top view

Bottom view

Embodiment

OPTICAL DISK DRIVE

CLAIM OF PRIORITY

The present application claims priority from Japanese patent application serial No. JP 2009-094941, filed on Apr. 9, 2009, the content of which is hereby incorporated by reference into this application.

BACKGROUND OF THE INVENTION (1) Field of the Invention

The present invention relates to an optical disk drive for recording and reproducing information with respect to an optical disk. More specifically, the present invention relates to a locking mechanism used when a tray on which an optical disk is placed is inserted into a chassis.

(2) Description of the Related Art

In general, an optical disk drive installed in an electronic device has a tray held in a drive body (chassis) so that the tray is automatically inserted into and ejected from the drive body or the chassis. The tray is ejected from the chassis to place an optical disk thereon, and is inserted into the chassis again. In this way, the optical disk is loaded into the drive body. The tray includes a spindle motor for rotating the optical disk, and an optical pickup movably attached in the radial direction of the optical disk to record or reproduce information by irradiating a laser beam to a recording surface of the optical disk.

When the tray is inserted into the chassis, a lock arm on the side of the tray is engaged and locked with a lock shaft on the side of the chassis. Thus, the tray is closed. The engagement between the lock arm and the lock shaft is released by pressing an eject button. Thus, the tray is opened. Here, in order to release the lock arm, a movable piece absorbed by a solenoid is removed from the solenoid. However, once removed from the solenoid, the movable piece no longer automatically returns to its initial position (reset state). For this reason, it is necessary to perform an operation (a reset operation) for returning the movable piece to the initial position at the time of the insertion of the tray into the chassis. Thus, the tray is provided with a reset arm for performing the return operation of the movable piece. The reset arm rotates when a projecting portion (a boss) provided on the side of the chassis is engaged with an end portion of the reset arm.

In order to normally perform the return operation of the movable piece, the engaging amount (overlapping amount) between the engaging boss and the reset arm should be set within a predetermined range. When the engaging amount is small, the return operation of the movable piece in the insertion of the tray is insufficient, and the lock operation of the tray fails. However, because of a clearance provided between the tray and the chassis for smooth insertion and ejection of the tray, it has been difficult to manage the engaging amount between the engaging boss and the reset arm.

To address the above problem, JP-A No. 66485/2007 discloses a configuration designed to avoid the failure of the engagement between the tray and the chassis. Here, there is provided an eject lock mechanism for engaging the chassis and the tray, a rail for movably holding the chassis and the tray, a rail holding portion provided in the tray to hold the rail, and a rail guide provided in the chassis to hold the rail. The rail guide has a projecting portion. When the tray is inserted into the chassis, the projecting portion is located on the side of a spindle motor rather than the rail, as well as on the side of the insertion direction of the tray rather than the rotation center of the spindle motor.

The JP-A No. 66485/2007 describes the effect as follows. When the tray is inserted into the chassis, it is possible to control a motion space of the tray, which extends in the direction perpendicular to the insertion direction of the tray and extends in the direction parallel to a principle plane of the chassis, within a certain range. In other words, it is possible to control the insertion condition of the tray having the eject lock mechanism, within a certain range. As a result, when the tray is inserted into the chassis, it is possible to avoid the failure of the engagement between the tray and the chassis that occurs due to the insertion condition of the tray.

SUMMARY OF THE INVENTION

An optical disk drive installed in a small electronic device, such as a notebook personal computer, is formed to have a thin chassis with a limited space for a locking mechanism used when a tray is inserted into the chassis. For this reason, it is necessary to perform a stable lock operation with a small number of components.

In JP-A No. 66485/2007, the motion space of the tray is controlled within a certain range by the projecting portion provided in the rail guide. However, the effect of controlling the motion space of the tray is limited to a back portion of the tray (the back direction than the rotation center of a spindle motor) in the near field region of the projecting portion. Meanwhile, the eject lock mechanism is located on the front side of the tray (located on the front side than the rotation center of the spindle motor), which is far from the projecting portion. Thus, the effect of controlling the motion space of the tray is reduced (and backlash remains). For this reason, it would be difficult to fully avoid the failure of the engagement between the tray and the chassis.

Further, in JP-A No. 66485/2007, the control effect from the projecting portion provided in the rail guide of the chassis, is transmitted to the locking mechanism of the tray through the rail and the rail holding portion. Thus, the number of components that dominate the engaging amount (overlapping amount) increases. For this reason, it would be difficult to achieve a stable lock operation with a small thickness and a small number of components as in the case of the notebook personal computer.

It is desirable to provide an optical disk drive for performing a stable lock operation with a small number of components at the time of the insertion of a tray.

The present invention is an optical disk device for recording and reproducing information with respect to an optical disk by inserting a tray, on which the optical disk is placed, into a chassis. The optical disk drive includes a locking mechanism which engages the inserted tray with the chassis, a reset arm provided in the tray to return the locking mechanism to the initial state, and an engaging boss that is provided in the chassis and is engaged with the reset arm. The tray includes a projecting portion for controlling the position of the engagement between the reset arm and the engaging boss.

Here, when the reset arm and the engaging boss are engaged with each other, the projecting portion of the tray comes into contact with a back surface of the engaging boss. In this way, the projecting portion controls the engaging amount between the reset arm and the engaging boss to be constant. The projecting portion is integrally formed with an inner side surface of the tray. The projecting portion has a flat contact surface with the engaging boss and an inclined end surface in the insertion direction of the tray.

Further, the present invention is an optical disk drive for recording and reproducing information with respect to an optical disk by inserting a tray, on which the optical disk is placed, into a chassis. The optical disk drive includes a locking mechanism which engages the inserted tray with the chassis, a reset arm provided in the tray to return the locking mechanism to the initial state, and an engaging boss that is provided in the chassis and is engaged with the reset arm. A projecting portion is provided in an inner side surface of the tray. When the tray is inserted into the chassis, the projecting portion comes into contact with the engaging boss to control the lateral position of the tray with respect to the chassis.

According to the present invention, it is possible to prevent an engaging failure in the lock operation of the optical disk drive and to perform a stable lock operation.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Hereinafter, an embodiment of the present invention will be described with reference to the accompanying drawings.

Figure 1A:
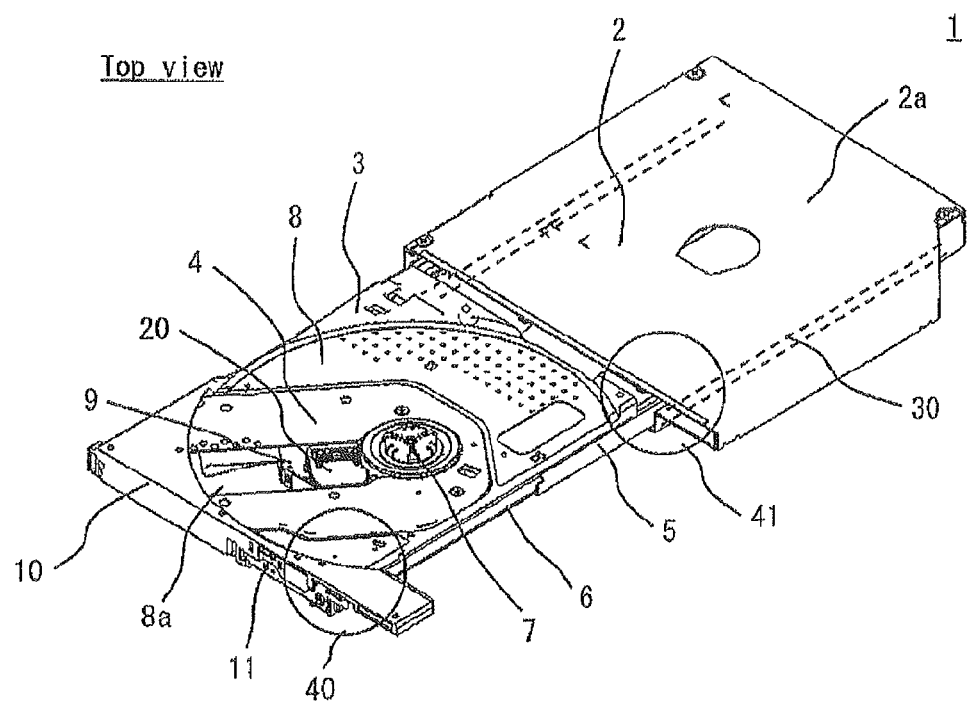
FIG. 1A is an external view showing the top of an optical disk drive according to an embodiment of the present invention.
Figure 1B:
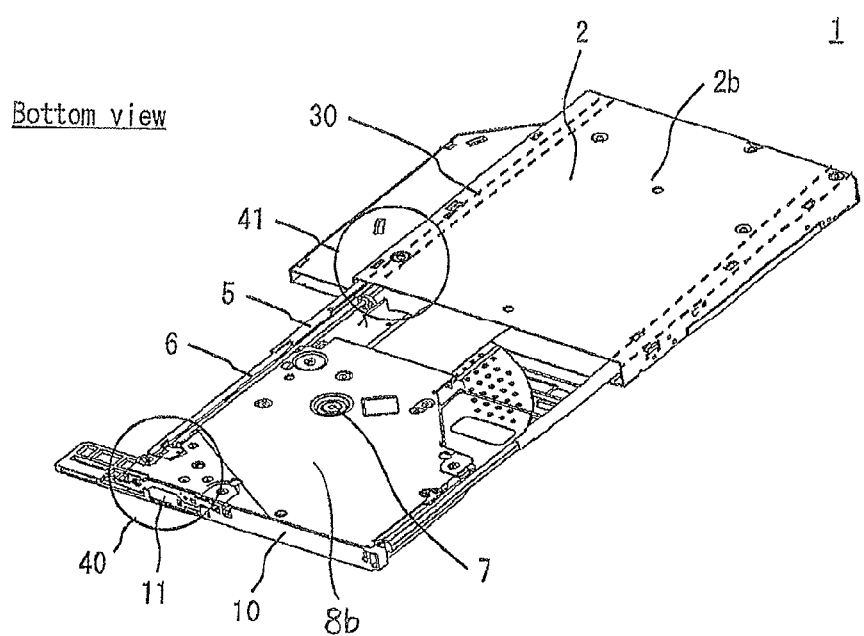
FIG. 1B is an external view showing the back of the optical disk drive according to an embodiment of the present invention.

FIGS. 1A and 1B are external views of an optical disk drive according to an embodiment of the present invention. FIG. 1A is a perspective view seen from the top side of the optical disk drive, and FIG. 1B is a perspective view seen from the back side thereof. In FIGS. 1A and 1B, reference numeral 1 denotes an optical disk drive, reference numeral 2 denotes a chassis, reference numeral 2a denotes an upper chassis portion, reference numeral 2b denotes a lower chassis portion, reference numeral 3 denotes a tray, reference numeral 4 denotes an optical pickup module, reference numeral 5 denotes a rail, reference numeral 6 denotes a rail holding portion, reference numeral 7 denotes a spindle motor, reference numeral 8 denotes a cover, reference numeral 8a denotes an opening, reference numeral 8b denotes a back cover, reference numeral 9 denotes a carriage, reference numeral 10 denotes a bezel, reference numeral 11 denotes an eject button, reference numeral 20 denotes an optical pickup, and reference numeral 30 denotes a rail guide.

The optical disk drive 1 includes the chassis 2 and the tray 3. The tray 3 is held by the chassis 2 in such a way that the tray 3 is automatically inserted into and ejected from the chassis 2. The chassis 2 is formed by combining the upper chassis portion 2a and the lower chassis portion 2b, which are formed from metal. In other words, the chassis 2 has a sac-like structure in which the tray 3 is inserted from the opening of the chassis. In the back cover 8b of the tray 3, the optical pickup module 4 is mounted to record and reproduce information by irradiating a laser beam to an optical disk.

The optical pickup module 4 includes the spindle motor 7 for rotating and driving the optical disk, the cover 8 with the opening 8a provided along the spindle motor 7 to the outer periphery, and the carriage 9 partially exposed from the opening 8a. The carriage 9 is movably held by a plurality of guide shafts provided in the optical pickup module 4. Thus, the carriage 9 moves close to and away from the spindle motor 7 by a feed motor not shown. The carriage 9 includes the optical pickup 20 including a light source, such as a laser diode for irradiating a laser beam to the optical disk, and other various components such as an objective lens.

The insertion and extraction movement of the tray with respect to the chassis is performed by means of the rail 5. The tray 3 is held on the rail 5 by means of the rail holding portion 6 provided in a side surface of the chassis 2. Further, the rail 5 is held by the rail guide 30 provided in a side surface of the chassis 2. In order to smoothly perform the insertion and extraction movement of the tray 3, a predetermined clearance is provided between the rail 5, the rail holding portion 6, and the rail guide 30.

When the tray 3 is inserted into the chassis 2, the bezel 10 provided in the front of the tray 3 is pushed into the side of the chassis 2. Then, the engaging portion (the lock shaft 18 described below) provided in the chassis 2 and the engaging portion (the lock arm 16 described below) provided in the tray 3 are engaged with each other. In this way, the tray 3 is locked into the chassis 2. When the tray 3 is ejected from the chassis 2, the engagement between the engaging portion of the chassis 2 and the engaging portion of the tray 3 are released by pressing the eject button 11 provided in the bezel 10. Then, the tray 3 is ejected from the chassis 2 to the front side of the optical disk drive 1. The locking mechanism of the tray 3 is provided in a portion denoted by reference numeral 40 on the back side of the eject button 11. The locking mechanism of the chassis 2 is provided in a portion denoted by reference numeral 41 corresponding to reference numeral 40. The locking mechanisms on both sides will be described below.

Figure 2:
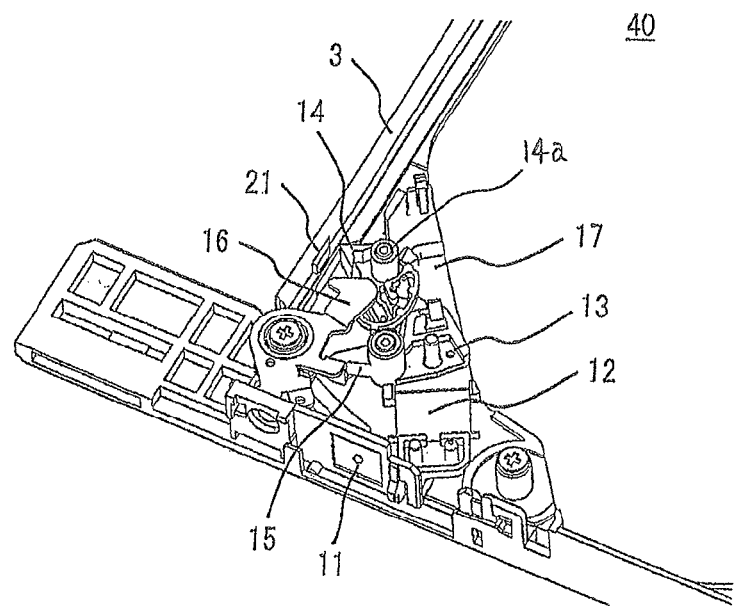
FIG. 2 is a perspective view showing the configuration of a locking mechanism on the side of a tray 2.
Figure 7A:
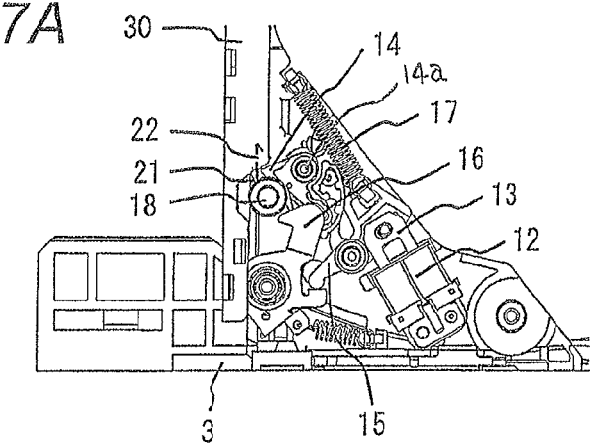
FIGS. 7A to 7C are plane views of the flow of the lock operation according to the present embodiment.
Figure 7B:
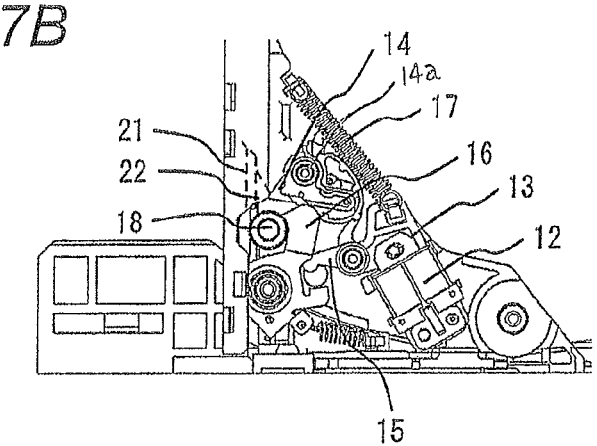
Figure 7C:
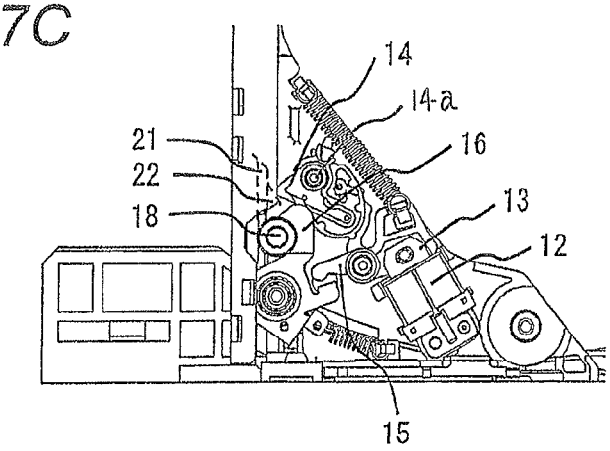

FIG. 2 is a perspective view showing the configuration of the locking mechanism on the side of the tray 2. FIG. 2 is an enlarged view of the portion denoted by reference numeral 40 in FIGS. 1A and 1B, as seen from the back side. The back cover 8b is omitted here for illustrative purposes. In FIG. 2, reference numeral 12 denotes a solenoid, reference numeral 13 denotes a movable piece, reference numeral 14 denotes a reset arm, reference numeral 15 denotes a release arm, reference numeral 16 denotes a lock arm, reference numeral 17 denotes an eject spring, and reference numeral 18 denotes a lock shaft. FIG. 2 shows the state in which the solenoid 12, the movable piece 13, and the eject spring 17 are removed from the tray 3. Note that FIGS. 7A to 7C show the state in which these components are mounted in the tray 3, which will be described below.

The lock arm 16 is engaged with the lock shaft 18 on the side of the chassis 2 to achieve a locked state. The release arm 15 rotates the locked lock arm 16 in the reverse direction to release the locked state. The release arm rotates according to the movement of the movable piece 13. The movable piece 13 is subject to an absorption force of the solenoid 12, and subject to a suction force of the eject spring 17. The movable piece 13 moves in either direction of the solenoid 12 or the eject spring 17. The reset arm 14 rotates when it is engaged with the engaging boss 22 on the side of the chassis 2 described below. Then, the reset arm 14 rotates the release arm 15 to move the movable piece 13, which is sucked by the eject spring 17, to the side of the solenoid 12. In this way, the movable piece 13 is absorbed by the solenoid 12.

In the present embodiment, a projecting portion 21 is provided inward in an inner side surface of the tray 3. The projecting portion 21 comes into contact with the engaging boss 22 on the side of the chassis 2. In this way, the projecting portion 21 controls the position in the lateral direction to the chassis 2 at the time of the insertion of the tray 3 (namely, in the direction parallel to the loading surface of the tray 3, and perpendicular to the insertion direction thereof). In other words, the projecting portion 21 has a function to control the positional relationship in the engagement between the engaging boss 22 and the reset arm 14, by coming into contact with the engaging boss 22.

Figure 3:
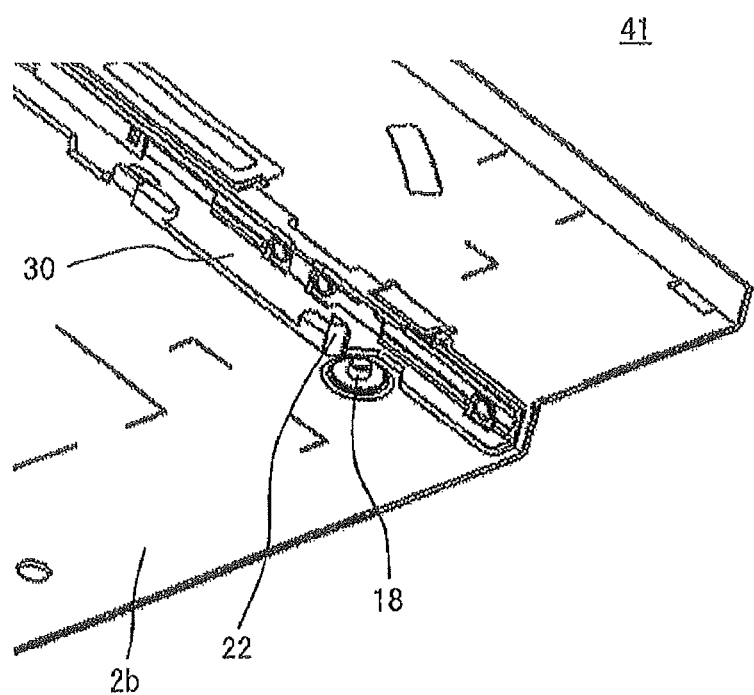
FIG. 3 is a perspective view showing the configuration of a locking mechanism on the side of a chassis 2.

FIG. 3 is a perspective view showing the configuration of the locking mechanism on the side of the chassis 2. FIG. 3 is an enlarged view of a portion denoted by reference numeral 41 in FIGS. 1A and 1B, as seen from the top of the optical disk drive 1. The upper chassis portion 2a is omitted here for illustrative purposes. The lower chassis portion 2b includes the lock shaft 18 with a cross-section of a cylindrical shape. The rail guide 30 includes the engaging boss 22 with a contact portion of a prismatic shape. The lock shaft 18 is engaged with an end portion of the lock arm 16 in FIG. 2. The engaging boss 22 is engaged with an end portion of the reset arm 14 in FIG. 2. Naturally, the lock shaft 18 and the engaging boss 22 are arranged according to the positions of the lock arm 16 and the reset arm 14, respectively, so that the engaging amount between the lock arm 16 and the reset arm 14 is a predetermined value.

In the state in which the tray 3 is inserted and locked into the chassis 2, the lock arm 16 on the side of the tray 3 is engaged with the lock shaft 18 on the side of the chassis 2. At this time, the movable piece 13 is absorbed by the solenoid 12. Along with the movement of the movable piece 13, the release arm 15 is separate from the lock arm 16, so as not to act on the lock arm and to keep the locked state. In other words, the movable piece 13 should be absorbed by the solenoid 12 in order to achieve the locked state.

On the other hand, the locked state is released by pressing the eject button to release the absorption of the solenoid 12 and the movable piece 13. Then, the movable piece 13 is subject to a suction force of the eject spring 17 to escape from the solenoid 12. Along with the movement of the movable piece 13, the release arm 15 rotates to rotate the lock arm 16. As a result, the engagement between the lock arm 16 and the lock shaft 18 is released, and thus the locked state is released.

Next, the tray 3 is inserted into the chassis 2 and goes to the locked state. At this time, the movable piece 13 once escaped from the solenoid 12 may not move to the side of the solenoid 12, even if the solenoid 12 is operated. In other words, the movable piece 13 may not return to the initial position (reset state). The locked state may not be achieved in this state, and it is necessary to return the movable piece 13 to the initial position with respect to the solenoid 12. More specifically, in association with the operation of inserting the tray 3 into the chassis 2, the reset arm 14 is engaged with the engaging boss 22 and is rotated to return the movable piece 13 to the initial position by means of the release arm 15. As a result, the locking mechanism returns to the initial position.

Figure 4:
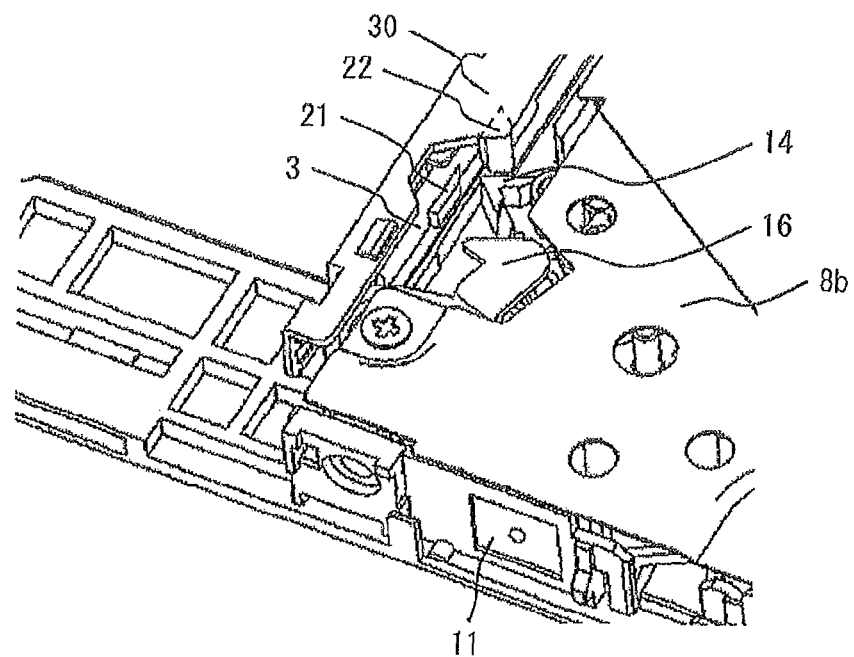
FIG. 4 is a perspective view showing a return operation of the locking mechanisms in the insertion of the tray.

FIG. 4 is a perspective view showing the return operation of the locking mechanism in the insertion of the tray 3. FIG. 4 shows the state in which the locking mechanism on the side of the tray 3 is combined with the rail guide 30 on the side of the chassis 2, as seen from the back of the optical disk drive 1. The lower chassis 2b and the lock shaft 18 thereof on the side of the chassis 2 are omitted here for illustrative purposes.

There are shown as the components involved in the return operation, the reset arm 14, the lock arm 16, and the projecting portion 21 on the side of the tray 3. Also, the rail guide 30 and the engaging boss 22 are shown on the side of the chassis 2. FIG. 4 shows the state in which the tray 3 is inserted into the chassis 2, with an end of the reset arm 14 coming into contact (engagement) with the engaging boss 22 of the rail guide 30. At this time, the projecting portion 21 of the tray 3 is coming into contact with a back surface of the engaging boss 22. In a conventional configuration, the distance in the engagement between the reset arm 14 and the engaging boss 22 varies because of the clearance existing between the tray 3 and the rail guide 30. In the present embodiment, the side of the projecting portion 21 of the tray 3 comes into contact with the back of the engaging boss 22. In this way, the projecting portion 21 controls the distance between the reset arm 14 and the engaging boss 22, so that the engaging amount between the reset arm 14 and the engaging boss 22 is substantially constant.

Figure 5:
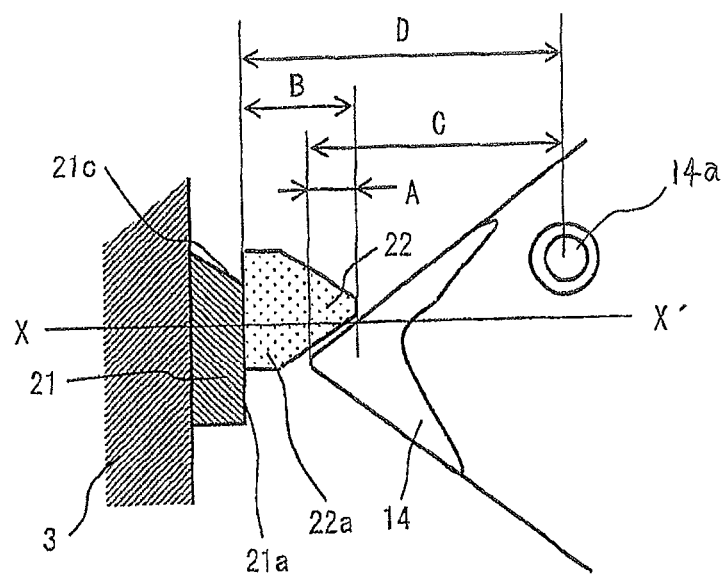
FIG. 5 is a schematic plane view of the engaging state between a reset arm 14 and an engaging boss 22.

FIG. 5 is a schematic plane view showing the engaging state between the reset arm 14 and the engaging boss 22. A side surface (control surface) 21a of the projecting portion 21 of the tray 3 comes into contact with a back surface 22a of the engaging boss 22. Thus, the projecting portion 21 controls the positional relationship between the reset arm 14 and the engaging boss 22. The engaging amount (overlapping amount) A between the reset arm 14 and the engaging boss 22 is determined as A=B+C−D, where B is the width of the engaging boss 22, C is the length of the end portion of the reset arm 14, and D is the distance between a shaft 14a and the control surface 21a of the projecting portion 21. Here, the shaft 14a of the reset arm 14, and the projecting portion 21 are integrally formed on the tray 3. Thus, the distance D can be accurately realized. As a result, the accuracy of the engaging amount A is dependent on the accuracy of the size of the two components, namely, the width B of the engaging boss 22 and the length C of the end portion of the reset arm 14.

In the conventional configuration, the number of components to be subject to size control is five including the rail and the rail guide. In the present embodiment, the projecting portion 21 directly controls the engaging boss 22 and the reset arm 14, which are the engaging members. Thus, the number of components to be subject to size control is reduced to two, allowing for easy control and for the reduction in the variation. As a result, the variation in the engaging amount (overlapping amount) A is significantly reduced to about one third compared to the variation in the past. This makes it possible to prevent the occurrence of an engaging failure in the lock operation.

The projecting portion 21 has a flat contact surface with the engaging boss, and has an inclined end surface in the insertion direction of the tray 3. With such a shape of the projecting portion 21, the contact operation with the engaging boss 22 can be smoothly performed.

Figure 6A:
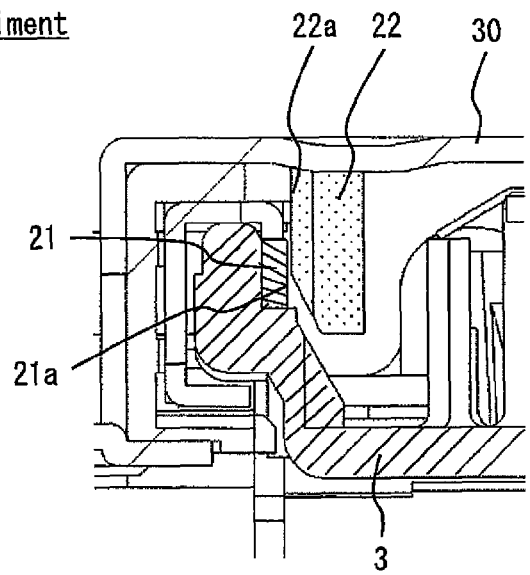
FIG. 6A is a cross-sectional view of the contacting state between a projecting portion 21 and the engaging boss 22 according to the present embodiment.
Figure 6B:
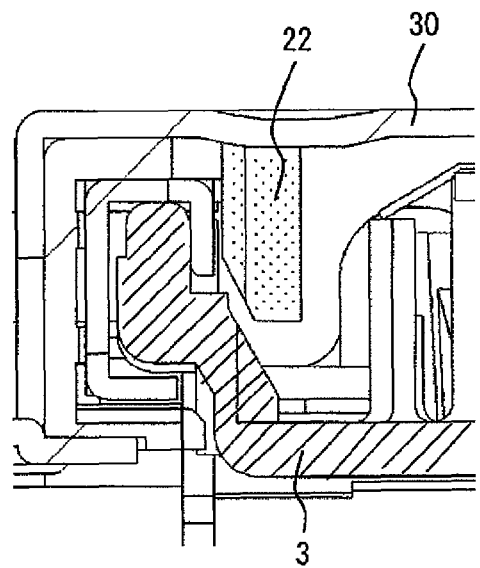
FIG. 6B is a cross-sectional view of the contacting state between the projecting portion 21 and the engaging boss 22 according to a conventional example.

FIGS. 6A and 6B are cross-sectional views of the contacting state between the projecting portion 21 and the engaging boss 22. FIGS. 6A and 6B show a cross section taken along line X-X' in FIG. 5. FIG. 6A shows the case of the present embodiment and FIG. 6B shows the conventional case for comparison purposes.

As shown in FIG. 6A, in the present embodiment, the back surface 22a of the engaging boss 22 of the rail guide 30 comes into contact with the control surface 21a of the projecting portion 21 of the tray 3. As a result, the positioning accuracy of the engaging boss 22 is increased with respect to the tray 3. On the other hand, in the conventional configuration shown in FIG. 6B, there is no mechanism to control the positional relationship between the engaging boss 22 and the tray 3. The engaging boss 22 is allowed to move by as much as the clearance originally existing between the rail guide 30 and the tray 3. For this reason, the positioning accuracy is low in the past.

FIGS. 7A to 7C are plane views of the flow of the lock operation in the present embodiment, as seen from the back of the optical disk drive 1.

FIG. 7A shows the state in which the lock operation is started, with the tray 3 inserted by a user into the chassis 3 along the guide rail 30 through the bezel 10. Here, the state is just before the lock arm 16 is engaged with the lock shaft 18, and just before the reset arm 14 is engaged with the engaging boss 22.

FIG. 7B shows the middle stage of the lock operation, in which the lock arm 16 starts engagement with the lock shaft 18 while the reset arm 14 is engaged with the engaging boss 22. At this time, the projecting portion 21 comes into contact with the back surface of the engaging boss 22 to control the position of the engaging boss 22. The rotation of the reset arm 14 is transmitted to the release aim 15. Then, the release arm 15 is rotated. The movable piece 13 of the release arm 15 is moved towards the solenoid 12, against the suction force of the eject spring 17. Then, the movable piece 13 is absorbed by the solenoid 12.

FIG. 7C shows the state in which the lock operation is competed with the lock arm 16 engaged with the lock shaft 18. At this time, the movable piece 13 returns to the initial position (reset state) within the solenoid 12. The engagement between the engaging boss 22 and the reset arm 14 is released. The reset arm 14 returns to the same position as shown in FIG. 7A. Further, the contact between the release arm 15 and the lock arm 16 is released to keep the locked state.

As described above, according to the present embodiment, the projecting portion 21 is provided on the side of the tray 3 in order to prevent an engaging failure in the lock operation upon insertion of the tray 3, and to have the effect of significantly increasing the margin of the lock operation.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disk drive for recording and reproducing information with respect to an optical disk by inserting a tray, on which the optical disk is placed, into a chassis,
the optical disk drive comprising:
a locking mechanism which engages the inserted tray with the chassis;
a reset arm provided in the tray to return the locking mechanism to an initial state; and
an engaging boss that is provided in the chassis and is engaged with the reset arm,
wherein the tray has a projecting portion for controlling the engagement position between the reset arm and the engaging boss;
wherein the locking mechanism comprises:
a lock shaft provided in the chassis;
a lock arm that is provided in the tray and is engaged with the lock shaft; and
a release arm for releasing the engagement of the lock arm,
wherein the reset arm returns a movable piece, which is associated with the release arm, to an initial position with respect to a solenoid that absorbs the movable piece, so that the locking mechanism is returned to the initial state.

2. The optical disk drive according to claim 1,
wherein when the reset arm and the engaging boss are engaged with each other, the projecting portion provided in the tray comes into contact with a back surface of the engaging boss, to control the engaging amount between the reset arm and the engaging boss to be constant.

3. The optical disk drive according to claim 1,
wherein the projecting portion is integrally formed in an inner side surface of the tray, having a flat contact surface with the engaging boss, and having an inclined end surface in the insertion direction of the tray.

4. An optical disk drive for recording and reproducing information with respect to an optical disk by inserting a tray, on which the optical disk is placed, into a chassis,
the optical disk drive comprising:
a locking mechanism which engages the inserted tray with the chassis;
a reset arm provided in the tray to return the locking mechanism to an initial state; and
an engaging boss that is provided in the chassis and is engaged with the reset arm,
wherein a projecting portion is provided in an inner side surface of the tray, coming into contact with the engaging boss to control the position in the lateral direction to the chassis at the time of the insertion of the tray;
wherein the locking mechanism comprises:
a lock shaft provided in the chassis;
a lock arm that is provided in the tray and is engaged with the lock shaft; and
a release arm for releasing the engagement of the lock arm,
wherein the reset arm returns a movable piece, which is associated with the release arm, to an initial position with respect to a solenoid that absorbs the movable piece, so that the locking mechanism is returned to the initial state.

* * * * *